US012100264B2

(12) United States Patent
Jordan

(10) Patent No.: US 12,100,264 B2

(45) **Date of Patent: *Sep. 24, 2024**

(54) GAMING TRACKING AND RECOMMENDATION SYSTEM

(71) Applicant: Aristocrat Technologies Australia Pty Limited, North Ryde (AU)

(72) Inventor: Richard Jeffrey Jordan, Las Vegas, NV (US)

(73) Assignee: Aristocrat Technologies Australia Pty Limited, North Ryde (AU)

( * ) Notice: Subject to any disclaimer, the term of this patent is extended or adjusted under 35 U.S.C. 154(b) by 0 days.

This patent is subject to a terminal disclaimer.

(21) Appl. No.: 18/337,342

(22) Filed: Jun. 19, 2023

(65) Prior Publication Data

US 2023/0334939 A1 Oct. 19, 2023

Related U.S. Application Data

(63) Continuation of application No. 17/183,123, filed on Feb. 23, 2021, now Pat. No. 11,727,749, which is a continuation of application No. 16/438,046, filed on Jun. 11, 2019, now Pat. No. 10,957,152, which is a continuation of application No. 15/208,203, filed on Jul. 12, 2016, now Pat. No. 10,360,758, which is a continuation-in-part of application No. 13/399,758, filed on Feb. 17, 2012, now Pat. No. 9,387,392.

(60) Provisional application No. 61/444,049, filed on Feb. 17, 2011.

(51) Int. Cl.
*G07F 17/32* (2006.01)

(52) U.S. Cl.
CPC ........ *G07F 17/323* (2013.01); *G07F 17/3239* (2013.01)

(58) Field of Classification Search
None
See application file for complete search history.

(56) References Cited

U.S. PATENT DOCUMENTS

| | | | |
|---|---|---|---|
| 5,016,879 | A | 5/1991 | Parker |
| 5,766,074 | A | 6/1998 | Cannon |
| 6,782,370 | B1 | 8/2004 | Stack |
| 6,912,505 | B2 | 6/2005 | Linden |

(Continued)

OTHER PUBLICATIONS

Office Action dated Oct. 6, 2020 for U.S. Appl. No. 16/438,046 (pp. 1-29).

(Continued)

*Primary Examiner* — Jay Trent Liddle
(74) *Attorney, Agent, or Firm* — Armstrong Teasdale LLP

(57) ABSTRACT

A recommendation system is provided, including a non-transitory memory, a processor, and a player interface. The non-transitory memory is configured to store a database including the player's playing history for a plurality of electronic gaming machines. The processor is coupled to the non-transitory memory and configured to gain access to the database and execute computer-executable instructions. The computer-executable instructions include a promotions engine operable to generate a list of electronic gaming machine recommendations personalized for a player based at least on the player's playing history. The promotions engine is further operable to generate a promotion based on the list. The player interface is accessible by the player and includes a display configured to present the promotion.

20 Claims, 9 Drawing Sheets

(56) References Cited

U.S. PATENT DOCUMENTS

| | | | |
|---|---|---|---|
| 7,113,917 | B2 | 9/2006 | Jacobi |
| 7,326,116 | B2 | 2/2008 | O'Donovan |
| 8,117,216 | B1 | 2/2012 | Chanda |
| 8,298,087 | B1 | 10/2012 | Smith |
| 8,874,502 | B2 | 10/2014 | Williamson |
| 9,087,123 | B2 | 7/2015 | Yoshizu |
| 2003/0195031 | A1 | 10/2003 | O'Donovan |
| 2004/0087360 | A1 | 5/2004 | Chamberlain |
| 2004/0092315 | A1 | 5/2004 | Boyd |
| 2005/0170890 | A1 | 8/2005 | Rowe |
| 2007/0155490 | A1 | 7/2007 | Phillips |
| 2007/0219000 | A1 | 9/2007 | Aida |
| 2008/0020845 | A1 | 1/2008 | Low |
| 2008/0096645 | A1 | 4/2008 | Frerking |
| 2008/0261699 | A1 | 10/2008 | Topham |
| 2009/0005174 | A1 | 1/2009 | Joo |
| 2009/0093290 | A1 | 4/2009 | Lutnick |
| 2009/0165633 | A1 | 7/2009 | Kyuma |
| 2009/0197681 | A1 | 8/2009 | Krishnamoorthy |
| 2009/0239661 | A1 | 9/2009 | Acres |
| 2010/0087247 | A1 | 4/2010 | Joshi |
| 2010/0287033 | A1 | 11/2010 | Mathur |
| 2010/0292000 | A1 | 11/2010 | Hornik |
| 2010/0298040 | A1 | 11/2010 | Joshi |
| 2011/0183762 | A1 | 7/2011 | Topham |
| 2011/0250971 | A1 | 10/2011 | Van Os |
| 2012/0021814 | A1 | 1/2012 | Gurovich |
| 2012/0144117 | A1 | 6/2012 | Weare |
| 2012/0184362 | A1 | 7/2012 | Barclay |
| 2012/0278320 | A1 | 11/2012 | Ogura |
| 2013/0046651 | A1 | 2/2013 | Edson |
| 2013/0090163 | A1 | 4/2013 | Edson |
| 2013/0268393 | A1 | 10/2013 | Haze |
| 2015/0099589 | A1 | 4/2015 | Smith |

OTHER PUBLICATIONS

Notice of Allowance dated Jan. 27, 2021 for U.S. Appl. No. 16/438,046 (pp. 1-9).

Office Action (Non-Final Rejection) dated Jul. 14, 2022 for U.S. Appl. No. 17/183,123 (pp. 1-8).

Office Action (Final Rejection) dated Jan. 10, 2023 for U.S. Appl. No. 17/183,123 (pp. 1-9).

Office Action (Notice of Allowance and Fees Due (PTOL-85)) dated Mar. 22, 2023 for U.S. Appl. No. 17/183,123 (pp. 1-12).

| PlayerId | Mnum | SiteID | EndTime | StartTime | TimePlayed | Location | CoinIn | CoinOut | Games | Jackpot | BillsIn | AverageBet | Win | TheoWin | CompEarn | TYPE | Tripnum |
|---|---|---|---|---|---|---|---|---|---|---|---|---|---|---|---|---|---|
| 7509340 | 101169 | 3 | 41:06.0 | 35:39.0 | 327 | 11506 | 16.79 | 10.79 | 72 | 0 | 0 | 0.23 | 6 | 0.98 | 0.049 | S | 16 |
| 18954410 | 101169 | 3 | 52:02.0 | 50:44.0 | 78 | 11506 | 0.09 | 0.05 | 1 | 0 | 0 | 0.09 | 0.04 | 0.01 | 0.0005 | S | 203 |
| 18954410 | 101169 | 3 | 53:26.0 | 52:03.0 | 83 | 11506 | 1.92 | 0.96 | 22 | 0 | 0 | 0.09 | 0.96 | 0.11 | 0.0055 | S | 203 |
| 18970470 | 101169 | 3 | 26:38.0 | 10:16.0 | 982 | 11506 | 40.32 | 44.24 | 224 | 0 | 0 | 0.18 | -3.92 | 2.35 | 0.1175 | S | 11 |
| 18970470 | 101169 | 3 | 28:39.0 | 23:24.0 | 315 | 11506 | 11.7 | 6.78 | 65 | 0 | 0 | 0.18 | 4.92 | 0.68 | 0.034 | S | 11 |
| 7444710 | 101169 | 3 | 54:14.0 | 48:08.0 | 366 | 11506 | 4.77 | 5.74 | 53 | 0 | 0 | 0.09 | -0.97 | 0.28 | 0.014 | S | 15 |
| 7376580 | 101169 | 3 | 00:30.0 | 56:40.0 | 230 | 11506 | 16.92 | 6.92 | 47 | 0 | 0 | 0.36 | 10 | 0.99 | 0.0495 | S | 5 |
| 19006680 | 101169 | 3 | 49:47.0 | 43:03.0 | 404 | 11506 | 50.85 | 61.65 | 113 | 0 | 0 | 0.45 | -10.8 | 2.96 | 0.148 | S | 53 |
| 7444710 | 101169 | 3 | 23:11.0 | 05:38.0 | 1053 | 11506 | 44.22 | 33.25 | 253 | 0 | 0 | 0.1747 | 10.97 | 2.58 | 0.129 | S | 15 |
| 48034690 | 101169 | 3 | 48:22.0 | 46:41.0 | 101 | 11506 | 2.22 | 0.97 | 15 | 0 | 0 | 0.148 | 1.25 | 0.13 | 0.0065 | S | 292 |
| 18961240 | 101169 | 3 | 01:19.0 | 58:44.0 | 155 | 11506 | 1.7 | 1.3 | 34 | 0 | 0 | 0.05 | 0.4 | 0.1 | 0.005 | S | 51 |
| 18961240 | 101169 | 3 | 02:07.0 | 01:38.0 | 29 | 11506 | 0.18 | 0.15 | 2 | 0 | 0 | 0.09 | 0.03 | 0.01 | 0.0005 | S | 51 |
| 18981440 | 101169 | 3 | 49:52.0 | 48:21.0 | 91 | 11506 | 4.05 | 3.1 | 9 | 0 | 0 | 0.45 | 0.95 | 0.24 | 0.012 | S | 213 |
| 19006680 | 101169 | 3 | 50:05.0 | 45:43.0 | 262 | 11506 | 42.84 | 48.23 | 68 | 0 | 0 | 0.63 | -5.39 | 2.5 | 0.125 | S | 58 |
| 48050980 | 101169 | 3 | 52:40.0 | 41:41.0 | 659 | 11506 | 36.81 | 31.81 | 198 | 0 | 0 | 0.1859 | 5 | 2.15 | 0.1075 | S | 6 |
| 18954410 | 101169 | 3 | 35:53.0 | 26:42.0 | 551 | 11506 | 15.8 | 14.9 | 126 | 0 | 0 | 0.1253 | 0.9 | 0.92 | 0.046 | S | 235 |
| 7652800 | 101169 | 3 | 40:03.0 | 38:34.0 | 89 | 11506 | 3.03 | 1.26 | 20 | 0 | 0 | 0.15 | 1.77 | 0.18 | 0.009 | S | 11 |
| 18954410 | 101169 | 3 | 51:47.0 | 48:08.0 | 219 | 11506 | 3.78 | 1.78 | 42 | 0 | 0 | 0.09 | 2 | 0.22 | 0.011 | S | 805 |
| 189956770 | 101169 | 3 | 15:01.0 | 07:48.0 | 433 | 11506 | 8.24 | 7.24 | 92 | 0 | 0 | 0.0895 | 1 | 0.48 | 0.024 | S | 212 |
| 7443290 | 101169 | 3 | 55:32.0 | 50:49.0 | 283 | 11506 | 11.34 | 6.44 | 63 | 0 | 0 | 0.18 | 4.9 | 0.66 | 0.033 | S | 175 |
| 19174290 | 101169 | 3 | 10:45.0 | 05:29.0 | 316 | 11506 | 22 | 9 | 30 | 0 | 0 | 0.7333 | 13 | 1.28 | 0.064 | S | 2 |
| 18956570 | 101169 | 3 | 39:30.0 | 37:52.0 | 98 | 11506 | 1.71 | 0.82 | 19 | 0 | 0 | 0.09 | 0.89 | 0.1 | 0.005 | S | 146 |
| 18954410 | 101169 | 3 | 37:22.0 | 33:08.0 | 254 | 11506 | 7.94 | 2.9 | 58 | 0 | 0 | 0.1368 | 5.04 | 0.46 | 0.023 | S | 184 |
| 7654300 | 101169 | 3 | 50:42.0 | 26:56.0 | 1426 | 11506 | 29.25 | 34.28 | 268 | 0 | 0 | 0.1091 | -5.03 | 1.71 | 0.0855 | S | 238 |
| 7654300 | 101169 | 3 | 49:43.0 | 44:31.0 | 312 | 11506 | 9.72 | 5.98 | 54 | 0 | 0 | 0.18 | 3.74 | 0.57 | 0.0285 | S | 13 |
| 18954410 | 101169 | 3 | 28:13.0 | 10:20.0 | 1073 | 11506 | 37.53 | 38.53 | 237 | 0 | 0 | 0.1583 | -1 | 2.19 | 0.1095 | S | 238 |
| 18954410 | 101169 | 3 | 48:35.0 | 45:01.0 | 214 | 11506 | 4.59 | 2.63 | 51 | 0 | 0 | 0.09 | 1.96 | 0.27 | 0.0135 | S | 241 |
| 19150450 | 101169 | 3 | 16:08.0 | 14:08.0 | 120 | 11506 | 5.76 | 1.92 | 32 | 0 | 0 | 0.18 | 3.84 | 0.34 | 0.017 | S | 576 |
| 19150450 | 101169 | 3 | 00:16.0 | 55:08.0 | 308 | 11506 | 14.22 | 9.32 | 79 | 0 | 0 | 0.18 | 4.9 | 0.83 | 0.0415 | S | 613 |

*FIG. 11*

| ROWTYPE_ | VARNAME_ | Label | Male | Age | TP0161 | TP0162 | TP0163 | TP0461 |
|---|---|---|---|---|---|---|---|---|
| Label | | | Male (0/1) | Age at End of 2010 | JACKPOT DELUXE LADIES DAY | Red White & Blue ◇ | ZEUS | Witches-Riches ◇ |
| MEAN | | | 0.483387288 | 51.39019348 | 44.15887806 | 43.82525144 | 43.72592303 | 15.6407418 |
| STDDEV | | | 0.499724344 | 15.3254158 | 4321.649885 | 986.4910128 | 2168.432446 | 714.3478695 |
| N | Male | Male (0/1) | 621512 | 621384 | 621512 | 621512 | 621512 | 621512 |
| N | Age | Age at End of 2010 | 621384 | 660703 | 660703 | 660703 | 660703 | 660703 |
| N | TP0162 | Red White & Blue ◇ | 621512 | 660703 | 687628 | 687628 | 687628 | 687628 |
| N | TP0462 | Triple Double Red White & Blue ◇ | 621512 | 660703 | 687628 | 687628 | 687628 | 687628 |
| N | TP1609 | AVP MB - RWB WILD STAR | 621512 | 660703 | 687628 | 687628 | 687628 | 687628 |
| CORR | Male | Male (0/1) | 1 | -0.0279506 | 0.00045879 | -0.000531298 | 0.00126737 | -0.00019702 |
| CORR | Age | Age at End of 2010 | -0.0279506 | 1 | 0.004744109 | 0.019966392 | 0.005009762 | 0.010195188 |
| CORR | TP0162 | Red White & Blue ◇ | -0.000531298 | 0.019966392 | 0.00275899 | 1 | 0.005469935 | 0.006181996 |
| CORR | TP0462 | Triple Double Red White & Blue ◇ | 0.000221951 | 0.010091605 | -0.000128862 | 0.02165926 | 0.000121004 | 0.002839925 |
| CORR | TP1609 | AVP MB - RWB WILD STAR | 0.003377187 | 0.002903702 | 0.000103216 | 0.006568106 | 0.000934762 | 0.000277 |

*FIG. 12*

GAMING TRACKING AND RECOMMENDATION SYSTEM

CROSS REFERENCE TO RELATED APPLICATIONS

The present application is a Continuation and claims the benefit of U.S. patent application Ser. No. 17/183,123, filed on Feb. 23, 2021, entitled "GAMING TRACKING AND RECOMMENDATION SYSTEM," which is a Continuation and claims the benefit of U.S. patent application Ser. No. 16/438,046, filed on Jun. 11, 2019, entitled "GAMING TRACKING AND RECOMMENDATION SYSTEM," which is a Continuation and claims the benefit of U.S. patent application Ser. No. 15/208,203, filed on Jul. 12, 2016, entitled "GAMING TRACKING AND RECOMMENDATION SYSTEM," now issued U.S. Pat. No. 10,360,758, which is a Continuation in Part and claims the benefit of U.S. patent application Ser. No. 13/399,758, filed on Feb. 17, 2012, entitled "GAMING TRACKING AND RECOMMENDATION SYSTEM," now issued U.S. Pat. No. 9,387,392, which claims the benefit of priority to U.S. Provisional Patent Application No. 61/444,049, filed on Feb. 17, 2011, all of which are herein incorporated by reference in their entirety.

BACKGROUND

The present disclosure is directed to computer implemented preference rating engines, and more particularly, a computer implemented rating engine to track, recommend, and promote electronic gaming machines to players.

Electronic gaming machines, including slot machines, come in a variety of implementations with a host of different qualities, characteristics and game play. Clearly, not every player is attracted to every game, and particular players have preferences for particular types of games. As a result, players tend to return time and again to their favorites. Gauging the overall relative popularity of any particular game is fairly straightforward. The metrics of time or money spent are collected electronically and allow for a simple calculation of a machine or a game's popularity.

However, the overall popularity of a game does not tell a particular player whether or not he or she will enjoy that game. Players are often attracted to a limited set of games and while players' tastes in games tend to be as varied as the individual players themselves, an individual player is attracted to games that reflect his or her own gaming preferences and styles.

People with similar tastes in games can be expected to be attracted to a similar set of games. One would expect that two players who both enjoyed the same specific game or, more preferably, games might share a similar preference for other games similar to those games they have in common. What is needed is a mechanism for matching a player's preferences to other games that can then be recommended to the player and allow the system or casino partners to promote the games to the players.

BRIEF DESCRIPTION

In accordance with the concepts described herein, preferred embodiments of recommendation system involving a computer implemented method for generating player recommendations for electronic gaming machines is described. The system collects data on player history playing particular electronic gaming machines and analyzes the collected data to generate a matrix of similar games based on the player history. The system then recommends electronic gaming machines to players based on the matrix of similar games.

In other embodiments, a recommendation system for recommending electronic gaming machines to a plurality of players is described. The recommendation system including a database holding information on each player's history with electronic gaming machines played by the player, the history including information on play time and bet size. An analytics engine analyzes the information in the database and to generate a list of player recommendations personalized for each player based on that player's history. A player interface is provided that is accessible by each player, wherein the player interface allows the player to interact with the recommendation system and to see the personalized recommendations.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

The embodiments described herein may be better understood by referring to the following description in conjunction with the accompanying drawings.

FIG. 11 is a table showing an exemplary sample player session ratings;

FIG. 12 is a table showing an exemplary time-played matrix.

DETAILED DESCRIPTION

Figure 1:
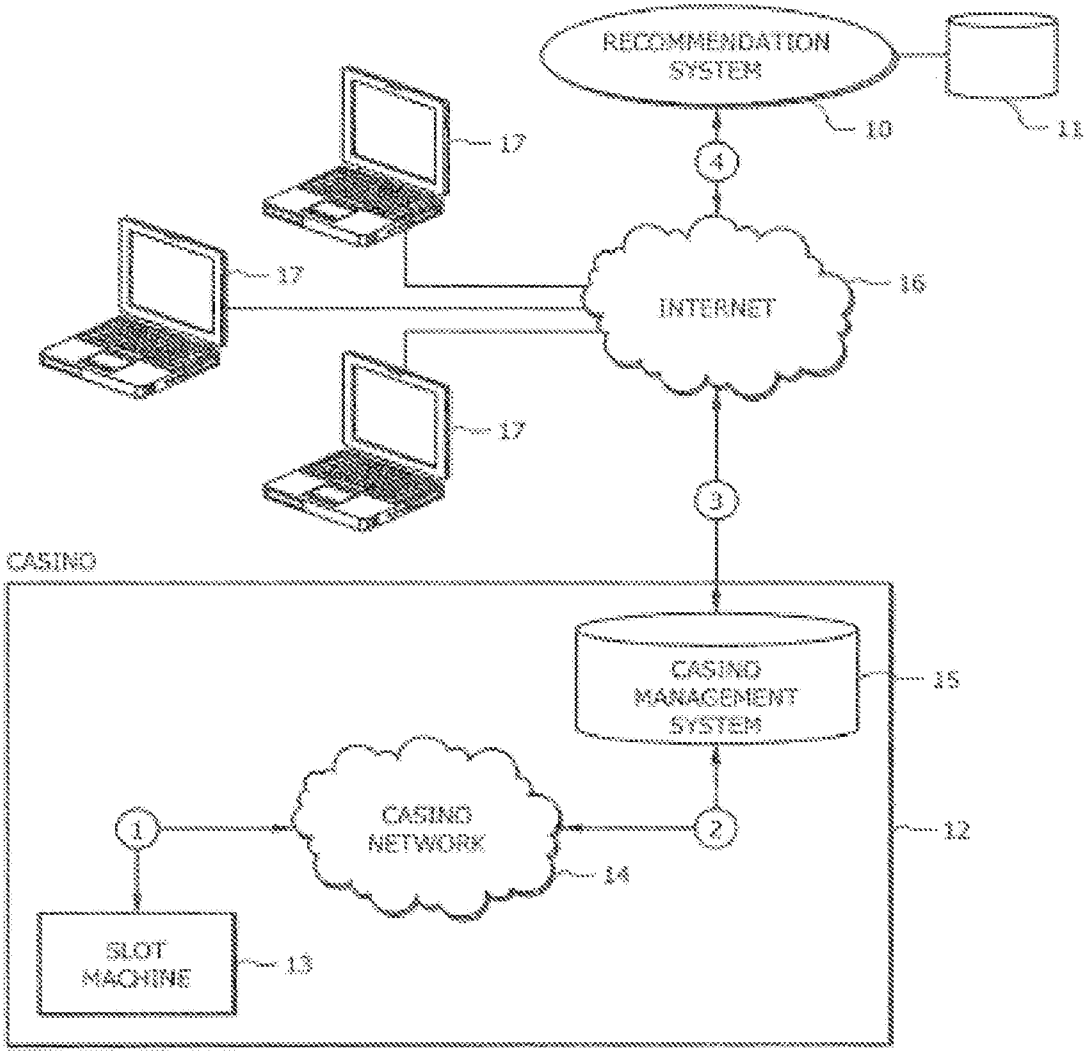
FIG. 1 is a system diagram of an embodiment of a system for recommending electronic gaming machines to players based on player preferences.

Referring now to FIG. 1, an exemplary embodiment of the game recommendation engine is shown. Recommendation system 10 receives data from participating casinos 12 or from players 17 entering preference data, which is stored in database 11. Existing casino management systems 15 create player ratings and histories when a player places a player tracking card in the slot machine 13 and begins to play. Each bet and game outcome, win or loss, is tracked by the system based on the player tracker card that has a unique number that identifies the player to the system. As a player keeps playing, the system keeps track of every bet creating a rating of the player's activity during that session. Ratings end when the player removes the player tracking card and the system closes out the session. Time stamps are associated with player tracking card entry and removal. Data from the session is passed over the casino network 14 to the casino management system 15.

The casino management system 15 tracks the player's activity in the casino's database. As the data is passed over the casino network 14 to the casino management system 15, applications on the casino management system 15 process and store the data. The casino management system 15 aggregates the ratings into daily and trip activity. The data indicates how much the player actually loses and theoretically should lose based on the hold percentage of the game. Complimentary services are awarded to players based on these statistics, as well as other loyalty based offers, such as cashback and free slot play.

Leveraging the existing casino infrastructure, recommendation system 10 can use these casino player ratings to aid the casino in creating applications and promotions that enhance the players experience. The ratings data provides information related to how much the player plays on one game or a series of games. It also provides insight into the order of the games that are played. Since games have different play characteristics, graphics, and entertainment features, analytically we can identify groups of players and the games they prefer. By placing a player in a group, the system can then identify and recommend games that they may enjoy and have not yet played.

The recommended games are presented to the player in the form of a promotion, such as, for example, scavenger hunts, dreaming of a big pay day, jackpot leader board, game specific levels, challenges, promotion levels, and player scores and/or leader board. Promotions are triggered based on the player's history, the casino's current promotions, and/or player rating data, and may result in incentive awards, including, for example, cash and free play. Promotions and recommended games are presented to the player at electronic gaming machines, at kiosks, or on network enabled computing devices, such as, for example, personal computers, smart phones, tablet computers, and laptops, among others. Such personalized and dynamic promotions improve underlying casino management system technology by leveraging collected player rating data and player history data to generate personalized promotions, as opposed to over-generalized promotions that aim to direct player activity regardless of a particular player's preferences. Personalized and dynamic promotions facilitate more efficient operation of the casino management system through more-focused and personalized promotion presentations to each player.

In addition to using casino data, recommendation system 10 can collect data directly from players 17. Players 17 can log into recommendation system 10 over the Internet 16 through a player interface. Players 17 can then enter data related to various games. The data can be direct ratings of the games, such as one to five stars, or can be playing time data, such as is collected by the casino management system. All of the data collected by recommendation system 10 can be stored in database 11.

As described, embodiments of the game recommendation system 10 use player ratings and also incorporate data from different knowledge sources. Other knowledge sources include user feedback, game features, user item feedback, or other relevant data. The game recommendation system 10 can be used as a personalized agent providing players with advice on games they may find entertaining.

Figure 2:
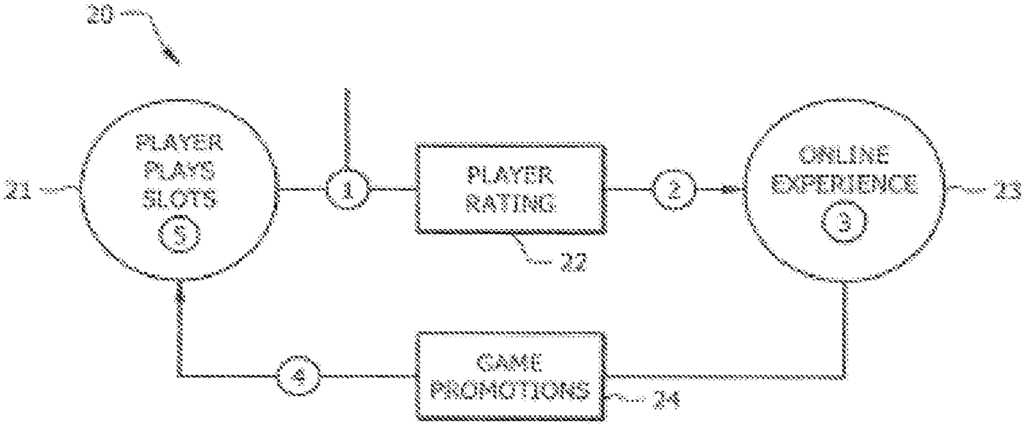
FIG. 2 is a flow diagram of an embodiment of a feedback loop utilizing a recommendation engine according to the concepts described herein.

Referring now to FIG. 2, in some embodiments the game recommendation system 10 from FIG. 1 can be used by casinos to encourage players to purchase more items, gain player loyalty by building a "value-added relationship" between the casino and the player, and can also be used to promote older and lower demanded games. It may also extend the life of older games by adding another layer to their entertainment values. In forming feedback loop 20, the game recommendation engine can use demographic data and content data such as information about the games features, game results, and behavior of different players as found in the player ratings data 22. The demographic data can include data on the player's sex, age, geographic location, income, household size, and other personal information that would be relevant to the system. Data can be entered by the player or retrieved from other external databases. Player based data can leverage a player-game rating matrix then make player-to-player correlations and make recommendations on games preferred by those players through an online experience 23 at a website associated with the recommendation engine. Leveraging the same player-game matrix, the system can make game-to-game correlations making recommendations based on those with the highest correlation. The online experience can also be used to participate in game promotions offered by the casinos or game manufacturers, participate in game achievements, share activities and recommendations through social media, participate in discussion boards, and access tutorials or evaluations for specific games.

Through the online experience 23, game promotions and offers 24 can be used to incentivize the player to return to the casino to play more and different slots 21. Game promotions are also generated according to personal recommendations for the player to keep the player engaged with preferred electronic gaming machines as well as similar electronic gaming machines. At the casino, players can access game recommendations and promotions via casino resources such as a kiosk, casino staff, or at the club desk, or can access the information through an app on a smart phone or table or through the website. In certain embodiments, game promotions are selected by a player, or selected based on input from the player.

Player ratings provide a tremendous amount of data that can be used to model individual players against statistical clusters of players. Recommendations can be based on matching a player to a particular cluster. Once a match is made, the recommendation can be delivered to the player via any one of the distribution channels discussed in this document. The recommendation may also be presented to the player as a promotion.

A hybrid approach can also be built leveraging demographic, player-to-game matrix delivering player-to-player correlations or game-to-game correlations, and/or the player rating model that examines the proportion of gambling activity on each game and derives a player's place in the statistical clusters. Any one of these models or some combination will provide reliable and meaningful recommendations to assist players in make game decisions.

As described, recommendation system 10 from FIG. 1 can use the collected data, whether it be from the casino or player, to produce a "personalized" list of games that would be of interest to a particular player by matching that player's preferences to other players with similar tastes in games, or by identifying a set of game characteristics in those preferred games and matching those to other games with similar characteristics. A few game preferences expressed by the player as well as the player's demographic characteristics could be used to provide the player with a list of games that would be well suited to the player's gaming tastes. Recommendation system 10 is further configured to generate promotions based on the list of games.

In an embodiment of the system, it would be helpful to produce lists of associated games. This list can be contingent upon first determining the degree to which play of any particular game is related to play of any other game. This can involve following the individual play behaviors of a large population of players over time or characterizing individual games. The players should have access to a wide variety of games and their gaming activities for the various games they play and should be quantified and cumulated for each player individually.

In order to determine which games are among a player's favorites, it is helpful to track the play behavior of individual players. The play behavior of a player can be monitored through player club card usage at casinos, or by direct data entry by the players. Club card usage might be preferable, where possible as the statistics are inherently more accurate. When a player uses his player club card the play behavior is automatically recorded electronically. This allows for the tracking of player behavior over multiple sessions, over multiple machines, over an extended period of time. Player session data, automatically captured electronically, contains relevant information regarding start and end times, play time, bets, etc., as well as the player club ID, machine number, and site ID. The player club ID can also be linked to other demographic information regarding the player such as age and gender.

Figure 3:
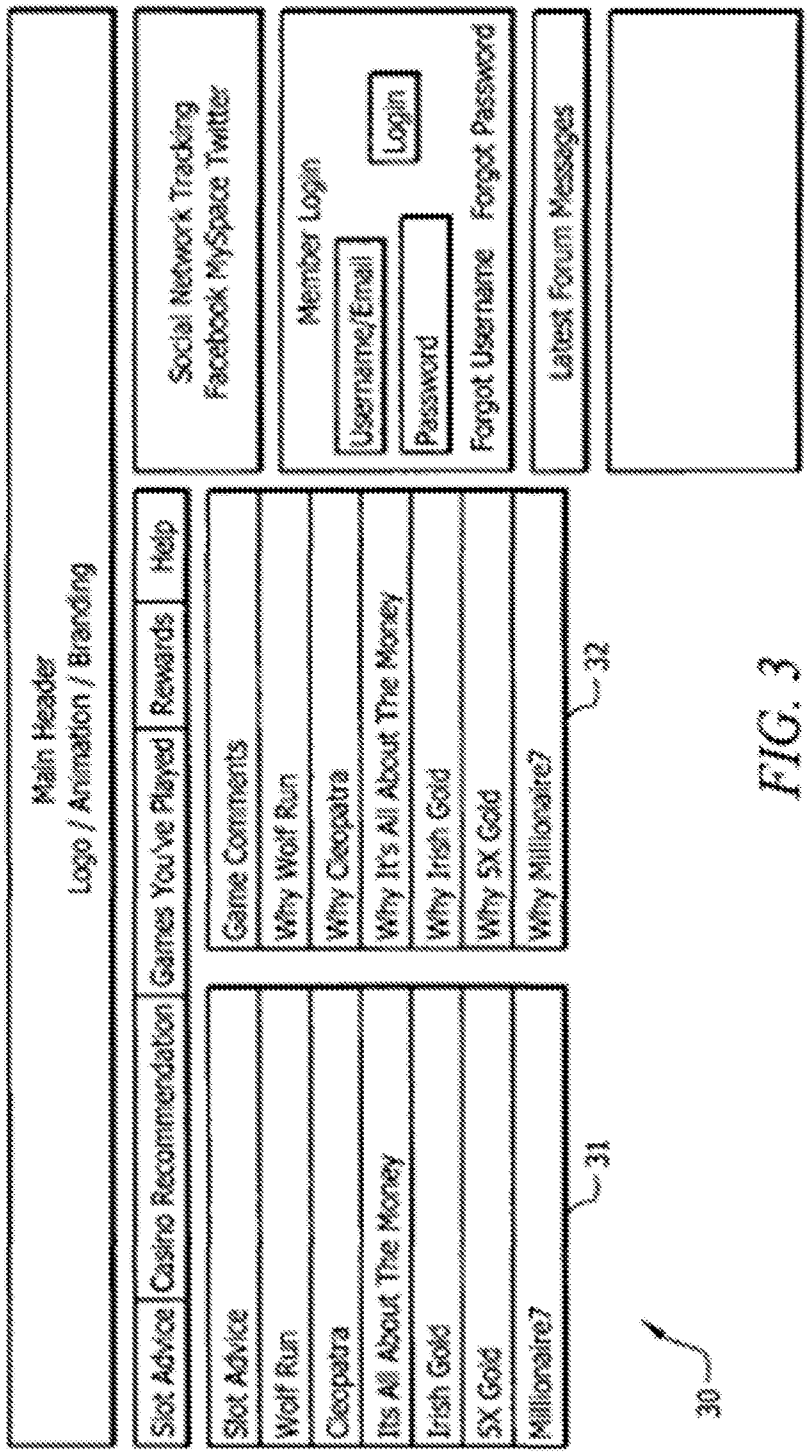
FIG. 3-8 are exemplary of screen shots from an embodiment of a player interface for a recommendation engine according to the concepts described herein.

Referring now to FIG. 3, an embodiment of a screen from a browser or other interface 30 illustrate an exemplary mechanism for player interaction with the recommendation system of the present invention. The column slot advice 31 is showing the recommendation developed by analyzing the player's player ratings with other players' player ratings. The player can click on the Why Wolf Run in the comments column 32 to get an explanation on why the game is being recommended. The "why the game" could include elements found in analyzing player experiences on Wolf Run, including the type of bonus, the volatility of the game, and why other players may like the game based on feedback collected by the site.

Figure 4:
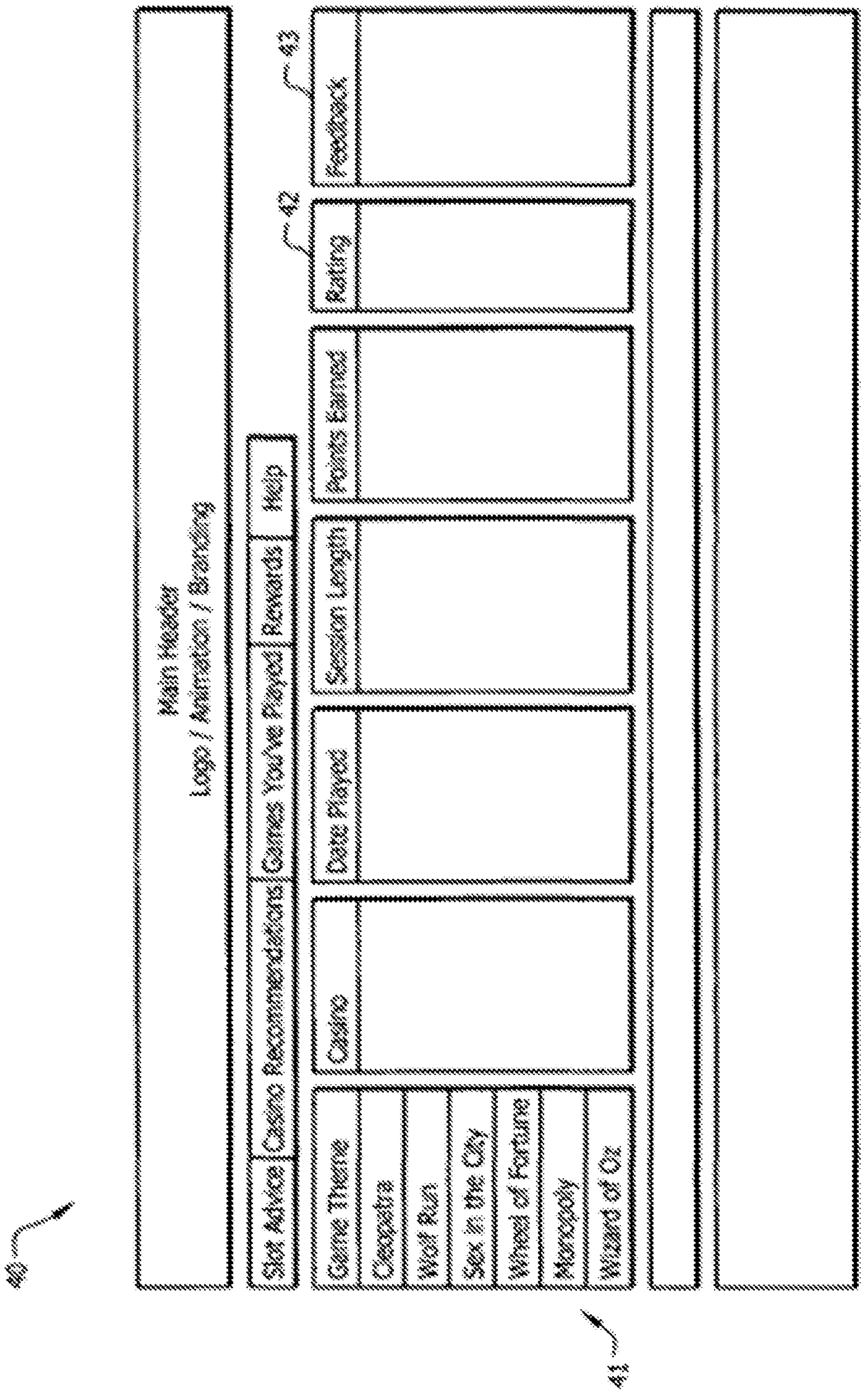

Referring now to FIG. 4, an exemplary screen 40 that illustrates exemplary details for the player ratings logged in the system is shown. This information includes play history 41 that shows the game type, the casino where the rating came from, the date of the rating, session length, and points earned. Rating 41 allows the player to provide a numerical feedback, e.g. 4 starts, on the entertainment value of that session. Feedback 42 is a free form where the player can provide commentary on the rating. Player feedback can be analyzed to assist in developing and describing game recommendations.

Figure 5:
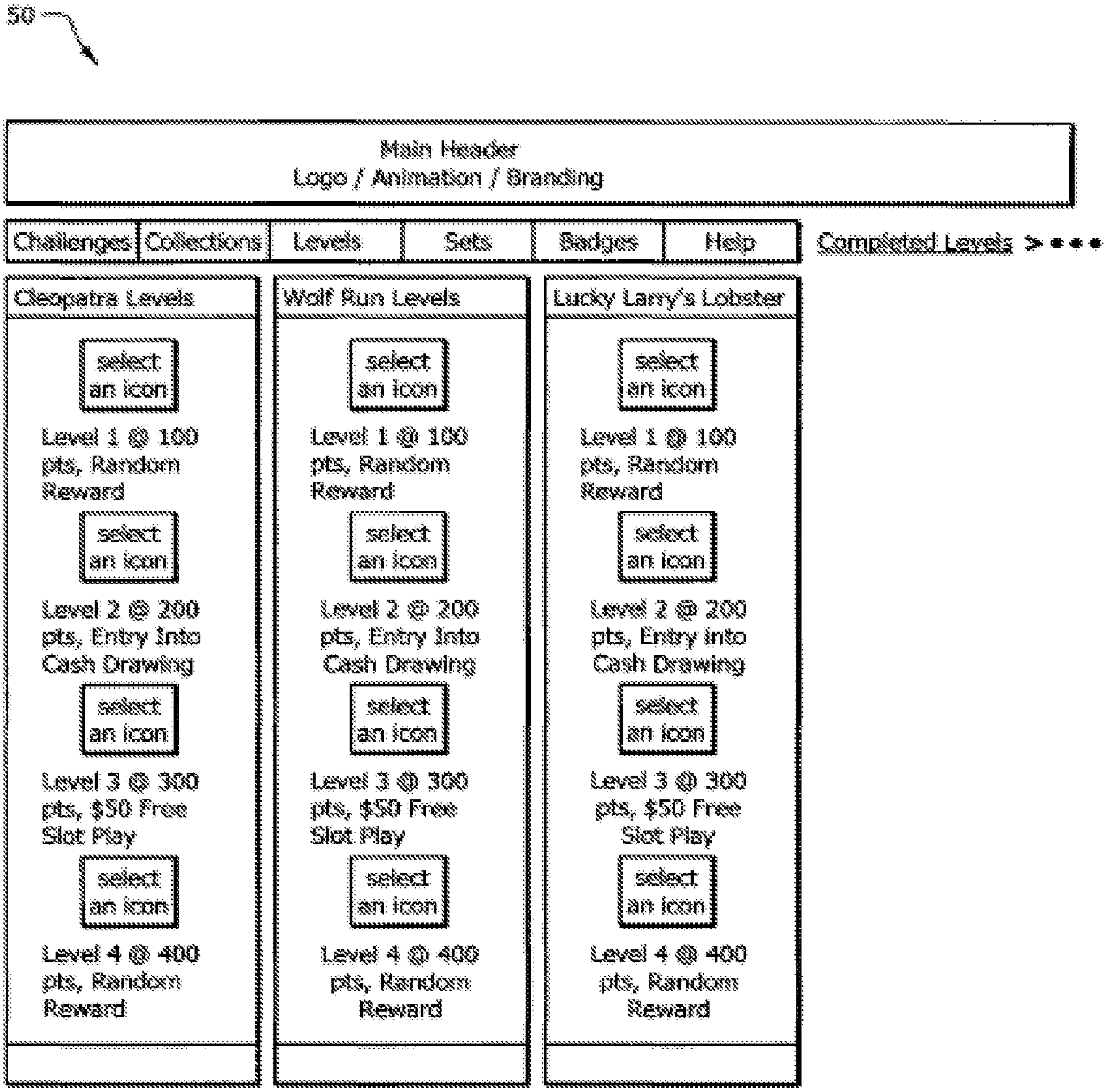

Referring now to FIG. 5, an exemplary screen 50 that illustrates exemplary players' standings relative to levels, challenges, collections or sets of games is shown. With player ratings, the system can identify those players who play a larger proportion of their gambling budget on the same game. This play pattern is indicative of a level of loyalty to the game. The promotion below encourages players to play more on a specific game by offering levels. At each level, the player is awarded a prize and earns a badge representing the achievement. Levels can be optimized to reflect the level of activity the player generates individually. In the example below, several games are identified with targets to be achieved to make the next level. Such promotions are generated based on the game recommendations.

The system can award virtual goods, prizes, free slot credits, entry into drawings for awards, and cash, and can include various player interfaces used to interact with the player, particularly with regard to prizes and promotions. The player interface is the activity that occurs on the screen or display of the user when the system recognizes a defined trigger. The exemplary interfaces, described in Table 1 below, can be a passive animation for the player to watch or can require interaction between the player and the system, such as selecting a box, stopping a wheel, performing a series of steps, or other interaction used for a player to claim a prize or award. The prizes and awards can be sponsored by a casino, game manufacturer, advertiser, product manufacturer or by the system itself.

TABLE 1

List of Possible Interfaces

| Description | Definition |
|---|---|
| Animation | The display shows an animation, without requesting action from a player. |
| Multi Animations | Multiple animations displaying the promotion in series. |
| Start Touch (generally this action can apply to many different variations of the interface) | The display requests the player to touch the screen, thus causing an animation to occur. A timeout may be associated with requesting a player's interaction. |
| Stop Touch (generally this action can apply to many different variations of the interface) | The display shows an animation, requesting a player to touch the screen to stop the animation. The player may believe there is a skill factor to stopping the animation. |
| Sum of Items (generally this action can apply to many different variations of the interface) | The chosen value to be awarded can be broken into several different values that add up to the chosen value. |
| Combination of Pay table (generally this action can apply to many | A particular outcome is tied to a value based upon a pay table. |

TABLE 1-continued

| List of Possible Interfaces | |
|---|---|
| Description | Definition |
| different variations of the interface) | |
| Pick x of n | The player chooses a number of items based out of a total number of possible items. |
| Pick x of n with Stop | The player chooses items out of a total number of possible items until a stop item is chosen. |
| Match x of n | The player chooses items until x number of matching items are chosen out of a total number of possible items. Items can contain a value or they can be images that tie to a fixed pay table. |
| Match x of n, faster | The faster the player matches an item, the larger the award. The award decrements on missed opportunities to make the match. |
| Take Offer, x of n | Player chooses to take the first offer or risk the amount for a second offer. The number of opportunities to risk the offer is based on x of n. |
| Pick x of n, with opportunity to repick | The player chooses items out of a total number of possible items, with the opportunity to redraw, if the player does not like the first pick. |
| Time Element (generally this action can apply to many different variations of the interface) | Players may have the opportunity to earn promotions that require them to continue to gamble a certain amount of money, earn a certain amount of points, or gamble for a certain amount of time. |
| Persistence - x of n, over some time element | Player has opportunity to pick pieces of an image over some element. Upon revealing an image, the player wins an award. |
| Receive Chances, over some time element | Player earns opportunities to win an award to be won at a later element. |

Figure 6:
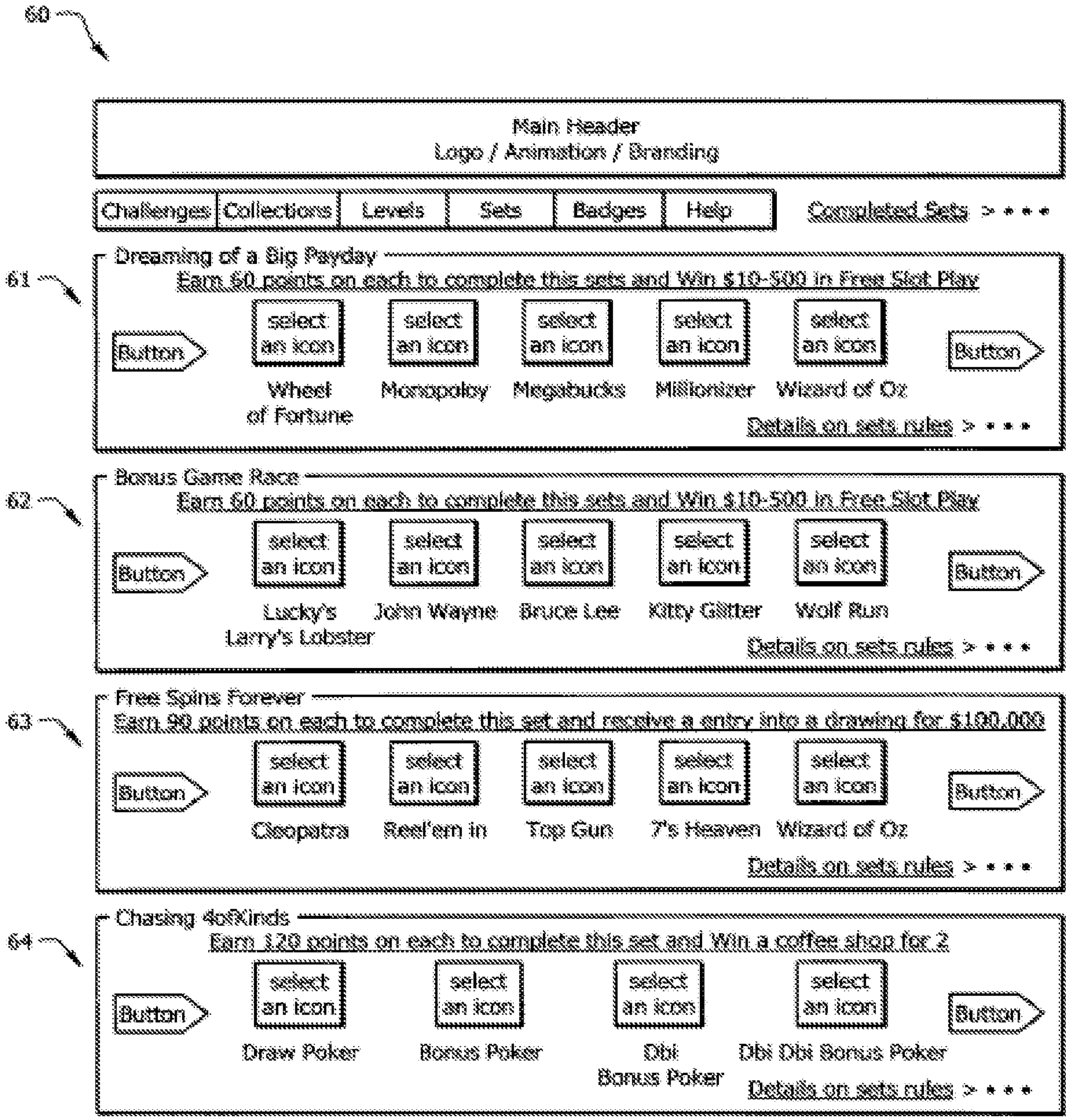

Referring now to FIG. 6, an exemplary screen 60 illustrating sets and how a casino might be configuring sets in the system is shown. A set could be grouping of games with similar volatility, top jackpot size, bonus round, or other unique configuration. The Dreaming of a Big Payday promotion 61 could group all games with a progressive jackpot>$100,000. The Bonus Game Race promotions 62 groups games with similar bonus rounds. Free Spin Promotion 63 groups games with a Free Spin feature. Chasing 4ofKinds 64 is a promotion grouping video poker games.

In a system with full connectivity, such promotions may be tied to individual features of the game. For example, Bonus Game Race could require player to have earned the Bonus round inherent in the game. The Free Spin promotion could require the player to earn Free Spins to mark that game of the promotion. With full integration into various games, the designs of set promotions are limited only by the common features among game types.

Figure 7:
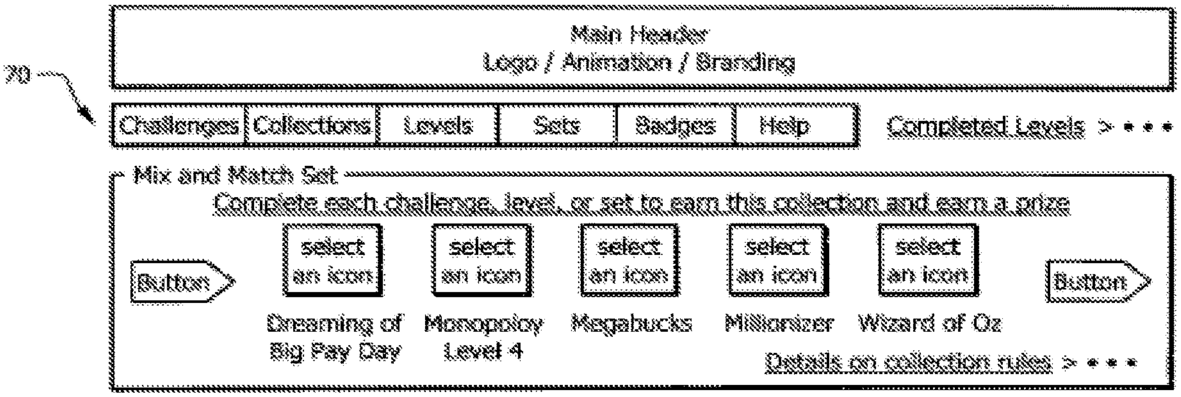

Referring now to FIG. 7 an exemplary screen 70 illustrating the concept of collections is shown. Collections are designed to enable the Casino to mix match challenges, sets, and levels into a collection promotion. In the example below, a player should complete the set Dreaming of a Big Pay Day, earn to level 4 on Monopoly, and earn challenges on Megabucks, Millionizer, and Wizard of Oz games. Collection promotions can sit on top of the other types of promotions such as those identified herein. Collections are harder to achieve and typically prizes are worth more to the player.

Figure 8:
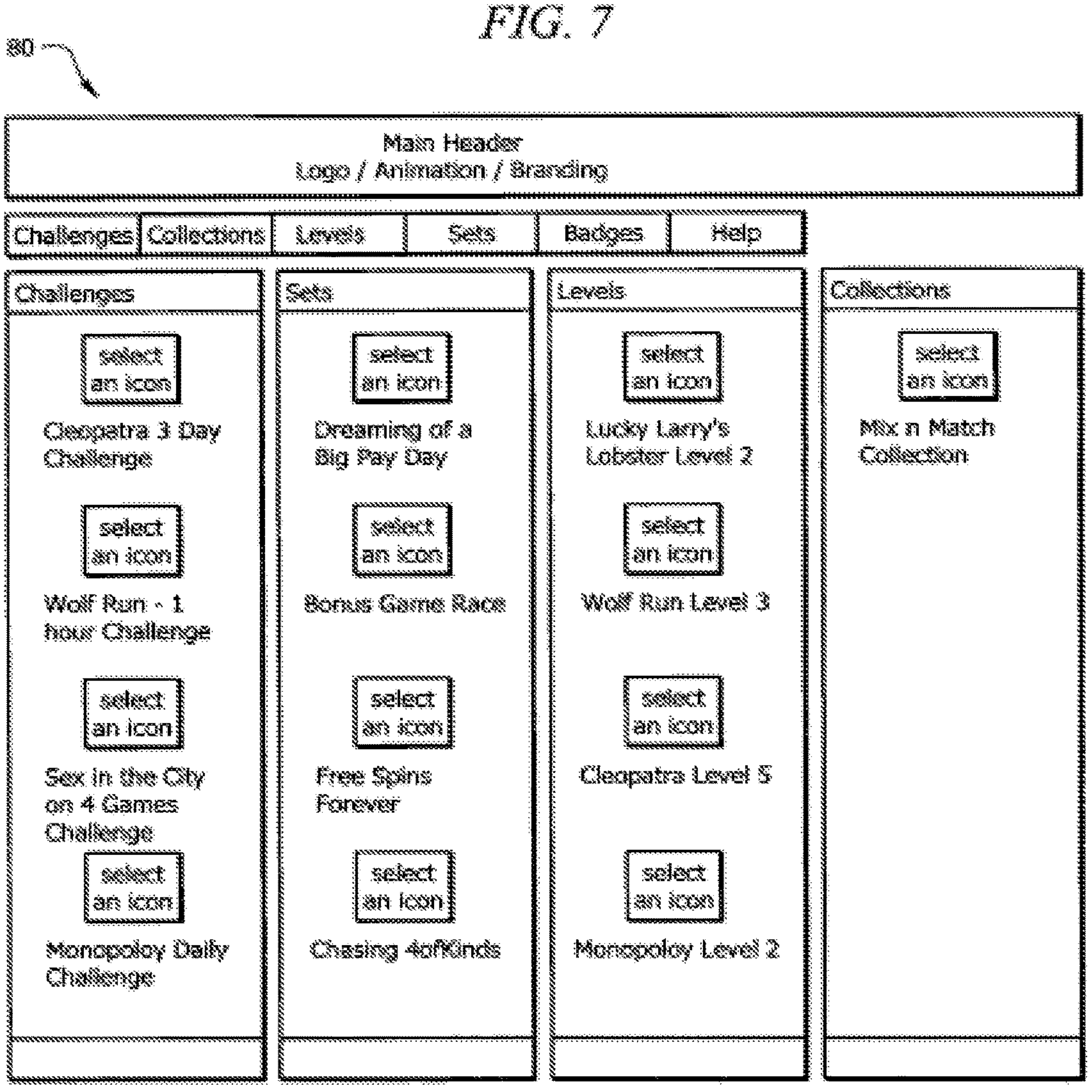

Referring now to FIG. 8, an embodiment of a screen 80 is shown. Screen 80 is an example representation of the badges earned by completing challenges, levels, sets, and collections. These badges represent the players' achievements and accomplishments. They can be easily published to a facebook or other social networking service.

Figure 9:
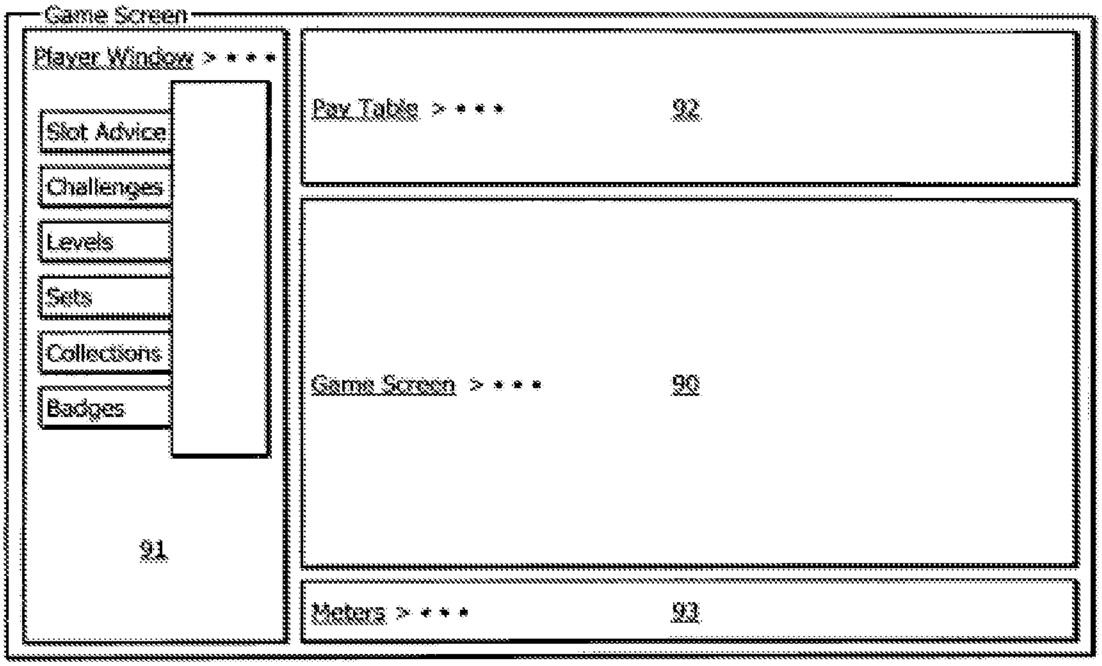
FIG. 9 is an exemplary of a game screen from an electronic gaming machine showing an embodiment of an interface to a recommendation engine according to the concepts described herein.

While all the screens shown above could be displayed via the internet, kiosks, or on a hand held device, they can also be seen on the screen of a slot machine. Referring now to FIG. 9, an example of how the information might be seen on a game screen is shown. The right part of the game screen is representative of the existing game screen 90 shrunk enough to make a player window appear on the left. Game screen 90 includes pay table 92 and coin and play meter 93. The player window 91 on the left contains information that can be accessed by the player based on the player account which is identified via a player tracking card or via a pin and electronic account number entry.

A player can choose slot advice, challenges, sets, levels, or collections, and immediately see the information and promotions that are personalized to the player. Slot advice provides the player personalized game recommendations. The remaining items are the individualized promotions, which are described above.

Figure 10:
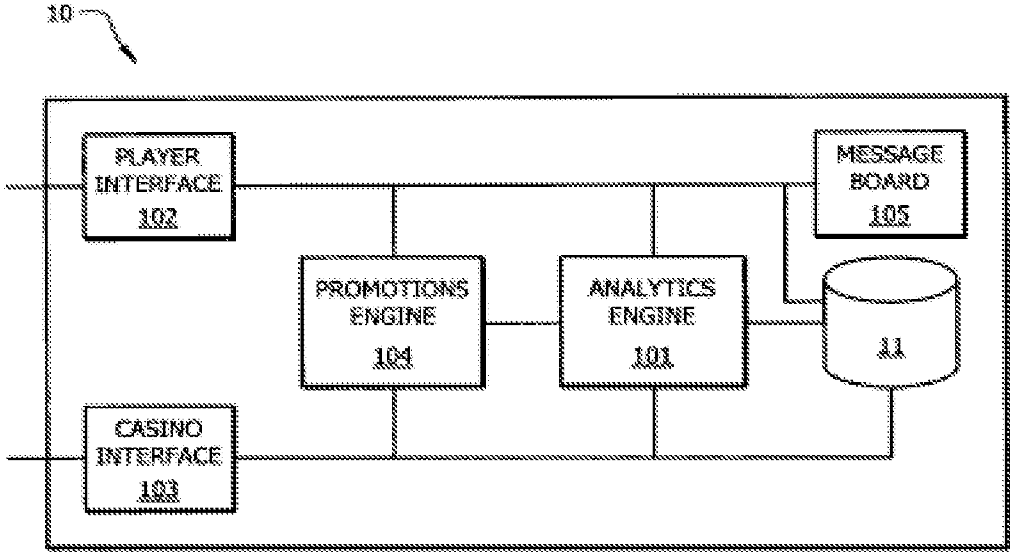
FIG. 10 is a block diagram of an exemplary recommendation system that may be used with the system shown in FIG. 1.

Referring now to FIG. 10, an exemplary recommendation system 10, as described in FIG. 1, is shown in more detail. Recommendation system 10 includes database 11, which stores all the player data and the correlation data. As described, analytics engine 101 uses the data to generate the recommendations and relationships between players and games. Casino interface 103 is the interface between the recommendation system 10 and the casinos and is used to gather and report player rating data and casino promotions data. Player interface 102 is the interface between the players and the recommendation system 10 and allows the players to interact with the system, enter data into the system, and interact with the promotions on the system. The promotions are controlled by promotions engine 104 which tracks the open promotions and the player status with respect to those promotions. Message board 105 is a message board accessible by the players, allowing players to interact and exchange information on games and related topics.

Referring now to FIG. 11, an exemplary table showing an example of a player session data is shown. The player session data is collected by the recommendation engine and used to perform the recommendation analysis. Referring now to FIG. 12, an embodiment of a table showing an example of a time played matrix is shown. The matrix shows an example of the correlations that can be calculated by the recommendation system.

The game recommendations of the recommendation system according to the concepts described herein can be implemented in any number of ways to achieve the goals described above. In preferred embodiments, the recommendation system can be implemented to produce matrices of games that show the relative strengths of association or “affinities” of the play levels of various games in a bivariate manner based on the amount of play. The quantification of the amount of play involves the amount of time actively engaged in the activity, the amount of money spent on the activity, and the frequency of play.

A Pearson Product-Moment Correlation Matrix meets the requirements of measuring the strength of association between all pairs of games. Further, the correlations allow assessment of the statistical significance of the bivariate relationships. The matrix can be used as a preliminary basis for constructing lists of associated games or game affinities. Factor analytic techniques can be used in conjunction with cluster analysis to identify distinct groupings of specific games based on the gaming activities of the individuals in the sample. A discriminant analysis can then be employed which can be used to “discriminate” among the lists of associated games using a minimal number of game preferences as well as a player’s demographic characteristics. As previously noted, each session records the play activity of a single player on a single machine. The particular game being played during a session is not recorded directly. In order to identify the game, the machine number and site ID are used to access characteristics of the machine, which are maintained in database referred to as a machine table. Manufacturer, denomination, and description are among the items that enable the game played to be identified. Unfortunately, the machine table entries may not point unambiguously to a standardized set of games.

As embodiments of the recommendation system may rely on proper identification of which games are played, the correct assignment of machines to games is crucial. A major task involves taking this descriptive information to relate the machines to their respective games. Slight differences in the descriptions as well as typos and abbreviations mean that game classification involves a great deal of processing to arrive at a set of clearly defined games.

A unit of analysis for the recommendation engine is the play behavior of an individual player as defined by his Player ID during a specified time period. While, useful data for a significant period, i.e. the past ten years, can be used, the most recent two years can be used to reflect “current” game affinities. Data from other years, on an annual basis, can be used to trace historical changes in game popularity and affinities. Gaming activity is measured by indicators which can include: time played, coin in, theoretical win, actual win, and number of games played (individual games played belonging to the same game classification).

Given N different games, the play activities for N different games are accumulated for each player. Thus gaming activity for a player would be expressed in terms of time played (seconds) with variables TimePlayed1, TimePlayed2, . . . TimePlayedN. For coin in (total$ value of wagers), the variables would be Coin-in1 through Coin-inN, and finally for number of games played (of the same type), NGames1 through NGamesN. The subscripts 1 through N indicate to which specific game the activity totals correspond. For each player, a record could contain sums of all the activity data from all the sessions (during the time period) associated with the PlayerID. These sums of the TimePlayed, Coin-in, and NGames could be tallied by Game (1-N).

From each session, the activity values (TimePlayed, Coin-in, and NGames) could be assigned to the variables for that particular game. For example, if the machine number and site ID indicated that this was Game=5 and that the session lasted 300 seconds (5 minutes), with 10.50 Coin-in and 21 games, then TimePlayed5=300, Coin-in5=10.50, and NGames5=21. All other TimePlayed, Coin-in, and NGames subscripted variables would be set to zeros.

For the analysis, all the sessions for each player (represented by his Player ID) could be combined into a single record where the values ofTimePlayed1 through TimePlayedN, Coin-in1 through Coin-inN, and NGames1 through NGamesN would be sums of their respective values from all of his sessions. Further, this player data for each individual player is linked to other player data collected by the casino such as Gender and Date of Birth.

In preferred embodiments of the recommendation system, overall game activity by game is calculated. Games can be ranked in terms of the TimePlayed, Coin-in, and NGames measures. Correlation matrices of the measures of activity by game type can be presented. As described, Pearson Product-Moment Correlation can be used to measure the strength of association between pairs of games. Again, TimePlayed, Coin-in, TheoreticalWin, ActualWin and NGames can be used as different measures of activity. The correlation coefficient r measures a least squares deviation from linearity between the two associated items. The r coefficient is widely used and has the advantage of being easily interpreted. The correlations allow assessment of the statistical significance of the bivariate relationships.

The matrix can be used as a preliminary basis for constructing lists of associated games or game affinities. Factor analytic techniques can be used in conjunction with cluster analysis to identify distinct groupings of specific games based on the gaming activities of the individuals in the sample. Factor Analysis and Cluster Analysis are two prominent techniques for analyzing the patterns of a large number of interrelated variables. Although the goals of the techniques are similar, the analyses are very different.

Factor analysis is a data reduction technique, which allows a large number of interrelated quantitative variables to be summarized into a smaller set of composite dimensions, or factors. After grouping, variables within each factor are more highly correlated with variables that define that factor than with variables in other factors.

Cluster analysis seeks to classify a set of objects into groups or categories without knowledge of the number or the members of the groups. In Cluster analysis, individuals or variables are grouped into clusters so that objects in the same cluster are homogeneous and there is heterogeneity across clusters. This technique is often used to segment data into similar, natural, groupings. Hierarchical clustering can be used where clustering begins by finding the closest pair of variables (by a distance measure) and combines them to form a cluster. The clustering algorithm proceeds a step at a time, joining pairs of variables, pairs of clusters, or a variable with a cluster until all the data are in a single cluster.

In preferred embodiments of the recommendation engine the analysis employs both factor analysis and cluster analysis. The results from a factor analysis can, in certain instances, provide input for cluster analysis. The results of the factor analysis, the cluster analysis, and the blended method can be assessed to ascertain which technique provides the most useful results.

Finally, a discriminant analysis can be employed which can be used to "discriminate" among the sets of associated games using a minimal number of game preferences as well as a player's demographic characteristics. The sets of game affinities are those derived using the factor analysis/cluster analysis results derived earlier.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

A computer, controller, or server, such as those described herein, includes at least one processor or processing unit and a system memory. The computer, controller, or server typically has at least some form of computer readable non-transitory media. As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit, and other programmable circuits "configured to" carry out programmable instructions, and these terms are used interchangeably herein. In the embodiments described herein, memory may include, but is not limited to, a computer-readable medium or computer storage media, volatile and nonvolatile media, removable and non-removable media implemented in any method or technology for storage of information such as computer readable instructions, data structures, program modules, or other data. Such memory includes a random access memory (RAM), computer storage media, communication media, and a computer-readable non-volatile medium, such as flash memory. Alternatively, a floppy disk, a compact disc—read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable, and include any computer program stored in memory for execution by personal computers, workstations, clients and servers.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

Although the present disclosure is described in connection with an exemplary gaming system environment, embodiments of the present disclosure are operational with numerous other general purpose or special purpose gaming system environments or configurations. The gaming system environment is not intended to suggest any limitation as to the scope of use or functionality of any aspect of the disclosure. Moreover, the gaming system environment should not be interpreted as having any dependency or requirement relating to any one or combination of components illustrated in the exemplary operating environment.

Embodiments of the present disclosure may be described in the general context of computer-executable instructions, such as program components or modules, executed by one or more computers or other devices. Aspects of the present disclosure may be implemented with any number and organization of components or modules. For example, aspects of the present disclosure are not limited to the specific computer-executable instructions or the specific components or modules illustrated in the figures and described herein. Alternative embodiments of the present disclosure may include different computer-executable instructions or components having more or less functionality than illustrated and described herein.

The order of execution or performance of the operations in the embodiments of the present disclosure illustrated and described herein is not essential, unless otherwise specified. That is, the operations may be performed in any order, unless otherwise specified, and embodiments of the present disclosure may include additional or fewer operations than those disclosed herein. For example, it is contemplated that executing or performing a particular operation before, contemporaneously with, or after another operation is within the scope of aspects of the present disclosure.

When introducing elements of aspects of the present disclosure or embodiments thereof, the articles "a," "an," "the," and "said" are intended to mean that there are one or more of the elements. The terms "comprising," "including," and "having" are intended to be inclusive and mean that there may be additional elements other than the listed elements.

The present disclosure uses examples to disclose the best mode, and also to enable any person skilled in the art to practice the claimed subject matter, including making and using any devices or systems and performing any incorporated methods. The patentable scope of the present disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A recommendation system comprising:
a memory device; and
a processor configured to execute instructions stored in the memory device, which when executed by the processor, cause the processor to at least:
retrieve, from the memory device, data associated with at least one game previously played by a first player;
generate, using at least the data associated with the at least one game previously played by the first player, at least one game recommendation personalized for a second player based on a determined correlation between the first player and the second player, wherein the correlation is determined based in part on a quantification of an amount of play of the first player, wherein the quantification of the amount of play includes at least one of i) an amount of time spent by the first player playing the at least one game previously played by the first player, ii) an amount of money spent by the first player playing the at least one game previously played by the first player, and iii) a frequency with which the first player played the at least one game previously played by the first player; and
provide, via a web-based player interface, the at least one game recommendation to the second player, the at least one game recommendation including the at least one game previously played by the first player.

2. The recommendation system of claim 1, wherein the instructions, when executed, further cause the processor to determine the correlation further based on a player-game rating matrix defining player correlations based on demographic data.

3. The recommendation system of claim 2, wherein the demographic data includes data relating to at least one of a sex, an age, a geographic location, an income, or a household size of the first player and the second player.

4. The recommendation system of claim 1, wherein the instructions, when executed, further cause the processor to generate the at least one game recommendation based on a strength of association between the at least one game previously played by the first player and at least one other game, and wherein the at least one game recommendation includes the at least one other game.

5. The recommendation system of claim 4, wherein the strength of association is based, at least in part, on the quantification of the amount of play of the first player.

6. The recommendation system of claim 1, wherein the at least one game previously played by the first player includes a plurality of levels indicating a level of activity of the first player in the at least one game, and wherein the data associated with at least one game previously played by the first player indicates a level of the plurality of levels.

7. The recommendation system of claim 1, wherein the instructions, when executed, further cause the processor to provide the web-based player interface to a web browser of the second player.

8. The recommendation system of claim 1, wherein the instructions, when executed, further cause the processor to at least generate, using at least the data received from the first player, a list of game recommendations personalized for the second player based on the determined correlation between the first player and the second player.

9. The recommendation system of claim 8, wherein the instructions, when executed, further cause the processor to at least provide the list of game recommendations to the second player via the web-based player interface.

10. The recommendation system of claim 1, wherein the instructions, when executed, further cause the processor to:
receive, from the second player via the web-based player interface, a request to share at least one of a game achievement or a game recommendation with a different player; and
provide the at least one of the game achievement or the game recommendation to the different player.

11. The recommendation system of claim 10, wherein the instructions, when executed, further cause the processor to provide the at least one of the game achievement or the game recommendation to a social media account of the different player.

12. The recommendation system of claim 1, wherein the web-based player interface includes an app stored on one of a smartphone or a tablet computing device of the second player, and wherein the instructions, when executed, further cause the processor to provide the at least one game recommendation to the app.

13. A casino management system comprising:
a player rating database configured to store playing history data of one or more players; and
a recommendation system communicatively coupled to the player rating database, the recommendation system configured to:
retrieve, from the player rating database, data associated with at least one game previously played by a first player;
generate, using at least the data associated with the at least one game previously played by the first player, at least one game recommendation personalized for a second player based on a determined correlation between the first player and the second player, wherein the correlation is determined based in part on a quantification of an amount of play of the first player, wherein the quantification of the amount of play includes at least one of i) an amount of time spent by the first player playing the at least one game previously played by the first player, ii) an amount of money spent by the first player playing the at least one game previously played by the first player, and iii) a frequency with which the first player played the at least one game previously played by the first player; and
provide, via a web-based player interface, the at least one game recommendation to the second player, the at least one game recommendation including the at least one game previously played by the first player.

14. The casino management system of claim 13, wherein the recommendation system is further configured to determine the correlation further based on a player-game rating matrix defining player correlations based on demographic data.

15. The casino management system of claim 14, wherein the demographic data includes data relating to at least one of a sex, an age, a geographic location, an income, or a household size of the first player and the second player.

16. The casino management system of claim 13, wherein the recommendation system is further configured to generate the at least one game recommendation based on a strength of association between the at least one game previously played by the first player and at least one other game, and wherein the at least one game recommendation includes the at least one other game.

17. The casino management system of claim 16, wherein the strength of association is based, at least in part, on the quantification of the amount of play of the first player.

18. The casino management system of claim 13, wherein the at least one game previously played by the first player includes a plurality of levels indicating a level of activity of the first player in the at least one game, and wherein the data associated with at least one game previously played by the first player indicates a level of the plurality of levels.

19. A method for providing one or more game recommendations, the method comprising:

retrieving, from a player rating database, data associated with at least one game previously played by a first player;

generating, using at least the data associated with the at least one game previously played by the first player, at least one game recommendation personalized for a second player based on a determined correlation between the first player and the second player, wherein the correlation is determined based in part on a quantification of an amount of play of the first player, wherein the quantification of the amount of play includes at least one of i) an amount of time spent by the first player playing the at least one game previously played by the first player, ii) an amount of money spent by the first player playing the at least one game previously played by the first player, and iii) a frequency with which the first player played the at least one game previously played by the first player; and providing, via a web-based player interface, the at least one game recommendation to the second player, the at least one game recommendation including the at least one game previously played by the first player.

20. The method of claim 19, further comprising determining the correlation further based on a player-game rating matrix defining player correlations based on demographic data.

* * * * *